United States Patent [19]

Laws

[11] Patent Number: 4,670,846
[45] Date of Patent: Jun. 2, 1987

[54] DISTRIBUTED BIT INTEGRATED CIRCUIT DESIGN IN A NON-SYMMETRICAL DATA PROCESSING CIRCUIT

[75] Inventor: Gerald E. Laws, Austin, Tex.

[73] Assignee: Texas Instruments Incorporated, Dallas, Tex.

[21] Appl. No.: 605,753

[22] Filed: May 1, 1984

[51] Int. Cl.[4] .............................................. G06F 15/06
[52] U.S. Cl. .................................. 364/490; 364/712; 364/200; 307/440
[58] Field of Search ............... 364/488, 489, 490, 491, 364/712, 200; 307/303, 440

[56] References Cited

U.S. PATENT DOCUMENTS

| | | | |
|---|---|---|---|
| 3,681,757 | 8/1972 | Allen et al. | 364/200 |
| 3,904,891 | 9/1975 | O'Lear | 307/440 |
| 4,086,657 | 4/1978 | Gaskill, Jr. et al. | 364/757 |
| 4,093,993 | 6/1978 | Sato | 364/712 |
| 4,145,749 | 3/1979 | Yoshimura et al. | 307/440 |
| 4,426,699 | 1/1984 | Tanaka et al. | 307/440 |
| 4,442,498 | 4/1984 | Rosen | 364/749 |

Primary Examiner—Parshotam S. Lall
Attorney, Agent, or Firm—Kenneth C. Hill; James T. Comfort; Melvin Sharp

[57] ABSTRACT

The present invention relates to construction of non-symmetrical N bit parallel data processing circuits using a plurality of identical integrated circuits chips. In such nonsymmetrical structures it is often impossible to provide a design employing identical integrated circuit chips using conventional techniques. The structure is first divided into single bit slices. These single bit slices are then examined to determine the number of each differing single bit type. A common divisor M is sought for the entire set of B(I)'s, where B(I) is the number of bits of the I-th type. A partial structure is formed in which B(I)/M of each I-th bit type is provided. The number M identical integrated circuits of this partial structure are formed. Lastly, these identical integrated circuits are interconnected to form the whole structure desired. In the event such a common divisor M is not found, the B(J)'s are adjusted by subtraction from a subset bit type and addition to a superset bit type which includes all of the structures of the subset bit type. When the integrated circuits are interconnected the redundant circuits are not connected. This technique advantageously reduces the number of custom integrated circuits needed to construct a nonsymmetrical structure thus reducing design and tooling costs while increasing the volume of the identical integrated circuits thus reducing the costs of these integrated circuits.

13 Claims, 7 Drawing Figures

DISTRIBUTED BIT INTEGRATED CIRCUIT DESIGN IN A NON-SYMMETRICAL DATA PROCESSING CIRCUIT

BACKGROUND OF THE INVENTION

The present invention relates to a manner of implementing complex non-symmetrical bit parallel data processing circuits in a plurality of integrated circuits. The advantages of employing custom designed integrated circuits for data processing applications is well known. These advantages include enhanced speed of operation, reduced final construction and assembly costs and increased reliability. It would be ideal if each desired data processing circuit could be integrated on to a single integrated circuit. However, there are many cases in which a complex data processing circuit cannot be placed all on a single integrated circuit because this data processing circuit involves too many signal input and output lines or is too complex as a whole for integration onto a single chip. However, many of the advantages of integration of a complex data processing circuit may be achieved by constructing this circuit of a small number of integrated circuits. Therefore, it is still advantageous to provide a complex data processing circuit in a small number of integrated circuits.

The prior art includes two techniques for construction of an integrated circuit set to embody complex logic functions which cannot be integrated onto a single chip. In the first technique, the complex data processing circuit is divided along functional lines. Then a number of different integrated circuits are construced in order to perform each of these differing functions. In the event that these functional elements are not standard integrated circuits, then a number of custom integrated circuit chips must be designed and manufactured in order to produce the data processing circuit. In many cases this technique is technically feasible. However, in other cases this scheme cannot be used because the interconnection required between these separate functions becomes too complex. A second technique employed to solve this problem involves division of the complex data processing circuit along bit boundaries. In such a case, each individual circuit may include a two-bit slice, a four-bit slice or other convenient number of bits. This solution is advantageous when each bit is identical, and therefore each of the bit slices are identical. However, in the case of a non-symmetrical data processing circuit, that is in the case when all bits do not include the same logic circuitry, this technique requires the construction of a number of differing custom integrated circuits. This technique does have the advantage that the interconnection between these integrated circuits is relatively straightforward.

Each of the techniques noted above have a substantial disadvantage. Each of these techniques require that a number of different custom integrated circuit designs be made. This requirement is disadvantageous because of the substantial cost involved in designing and tooling for manufacture of an integrated circuit. Each new custom integrated circuit requires a minimum of $300,000 to $500,000 regardless of the complexity of the integrated circuit design. Of course, a more complicated integrated circuit design would require a greater initial investment. In addition, a circuit which required fewer different types of custom integrated circuits would require greater numbers of each type. These greater numbers of each type contribute to enhanced yield and hence lower cost per integrated circuit. Therefore, it is highly advantageous from a cost standpoint in order to be able to minimize the number of custom integrated circuit designs required to implement the complex data processing circuit.

SUMMARY OF THE INVENTION

The present invention is a technique for simplified construction of a complex nonsymmetrical bit parallel data processing circuit. This technique involves division of the nonsymmetrical data processing circuit into a number of identical circuit blocks. Then this circuit block may be formed on a single custom designed integrated circuit. The complete data processing circuit is formed by interconnecting a plurality of identical custom integrated circuits according to this design.

The most important aspect of the present invention is the division of the complex nonsymmetrical data processing circuit into a number of identical circuit blocks. This partition of the data processing circuit is accomplished following a number of steps. Firstly, the data processing circuit is sliced into a number of circuits each containing a single bit. The circuits are then studied in order to identify within these single bit slices the groups of identical single bit types.

The next steps involve determination of a partial structure which can be repeated in a number of integrated circuits to implement the desired data processing circuit. Firstly, a common divisor is sought from among the previously determined number of bits of each different single bit type. Upon determination of a desirable common divisor, the partial structure has a number of each of the differing single bit types determined by dividing the number of that single bit type within the data processing circuit by the common divisor. A custom integrated circuit design is then made of this partial structure.

The total data processing circuit is then implemented in a plurality of these identical custom integrated circuits. This selection of differing bits to be placed on the custom integrated circuit design will often result in nonadjacent bits being on the same integrated circuit and adjacent bits being on differing integrated circuits. This division of adjacent bits being on differing integrated circuits may somewhat complicate the interconnection of the integrated circuits in order to provide the desired data processing circuit. However, in most instances such interconnection may be achieved in a straightforward manner.

This technique may still be advantageously employed even in the event that a common divisor is not found. If there is no common divisor among the different numbers of bits of each single bit type, such a common divisor may be achieved by adjustment of the numbers of bits between two different single bit types. It will often be the case that one of the single bit types includes a subset of the structures of another of the single bit types. One of the subset bit types is replaced by one of the superset bit types. This adjustment will result in one or more excess, unused circuits in the completed assembly. If after such an adjustment a common divisor is found then the data processing circuit may be partitioned in the same manner as outlined above. In this event, any excess circuits included in the superset single bit type are not connected upon final assembly of the data processing circuit. The custom integrated circuit design may have to be altered slightly to accommodate the nonconnection of these access circuits in the final design. This technique would be advantageous overall, if this technique enabled the construction of only a single type of custom integrated circuit.

The major advantage of the technique of this invention is in the reduction in the number of custom integrated circuit designs which must be made in order to embody the complex data processing circuit. Because of the relatively high design and tooling cost required for construction of a custom integrated circuit, this technique can be advantageously employed in a variety of instances. In some cases, because of the reduction of the number of custom integrated circuit designs necessary, it may be possible to provide an integrated circuit chip set for embodying a complex logic function which would otherwise be uneconomical. Even in the case in which the total volume of data processing circuits to be constructed would ordinarily make the design of a number of custom integrated circuits feasible, this technique can reduce the total overall cost, reduce the design risk by reducing the number of separate designs necessary, and increase the volume of the custom integrated circuit and therefore make its construction more economical.

BRIEF DESCRIPTION OF THE DRAWINGS

These and other features and advantages of the present invention will be readily apparent from the following description of the invention taken in conjunction with the drawings in which.

DETAILED DESCRIPTION OF THE PREFERRED EMBODIMENT

The present invention will now be described in conjunction with FIGS. 1 to 7 and Tables 1 to 6. It should be clearly understood that the matter illustrated in FIGS. 1 to 7 and listed in Tables 1 to 6 are merely illustrative of the present invention. The present invention can be achieved for circuits other than those illustrated in the figures in a manner other than that noted in Tables 1 to 6. Therefore, it should be understood that the foregoing description is intended only to set forth the principles of the present invention and not to limit its scope.

Figure 1:
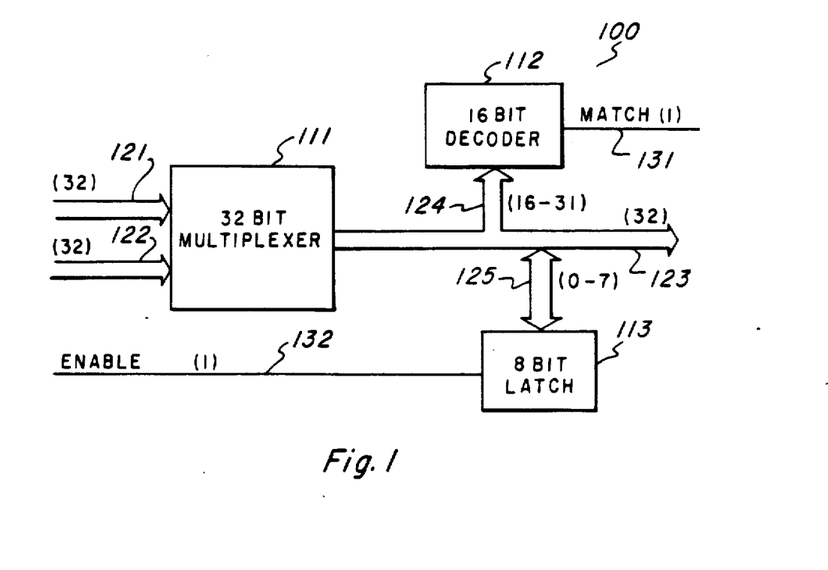
FIG. 1 illustrates an example of a complex nonsymmetrical data processing circuit to which the present invention may be advantageously employed.

FIG. 1 illustrates a complex nonsymmetrical bit parallel data processing circuit to which the present invention may be applied. FIG. 1 includes 32 bit multiplexer 111, 16 bit decoder 112 and 8 bit latch 113. Thirty two bit multiplexer 111 receives a input from 32 bit bus 121 and a second input from 32 bit bus 122. Thirty two bit multiplexer 111 combines the signals received on these buses and generates an output on 32 bit bus 123.

Sixteen bit decoder 112 receives an input on 16 bit bus 124 corresponding to the 16 most significant bits of 32 bit bus 123. Sixteen bit decoder 112 compares this input with an internal state. If there is a match between this internal state and the data received on 16 bit bus 124, then 16 bit decoder 112 generates an output on match line 131.

Eight bit latch 113 is coupled to 32 bit bus 123 via eight bit bus 125. Eight bit latch 113 receives an enable signal on line 132. Upon receipt of this enable signal, eight bit latch 113 stores therein the state of the eight bits received on eight bit bus 125.

The circuit illustrated in FIG. 1 is one of a type which would be difficult to place on a single integrated circuit chip. This is because of the large number of input and output lines required for this circuit. A total of 98 signal lines must be applied to this circuit, not including the required power supply and ground lines. Therefore, it would be difficult to construct a single integrated circuit having all of these functions. In addition, it should be clearly noted that this structure is nonsymmetrical. This is because the 32 bit parallel structure does not include the same circuits for each bit.

A close inspection of a circuit illustrated in FIG. 1, in conjunction with Table 1 indicates that there are three differing type of bits. Firstly, bits 0 to 7 include the 32 bit multiplexer 111 and the 8 bit latch 113. Next, bits 8 to 15 include only the 32 bit multiplexer 111. Lastly, the 16 most significant bits include both 32 bit multiplexer 111 and 16 bit decoder 112. In accordance with the principles of the present invention, there are three differing bit types within the data processing circuit 100 illustrated in FIG. 1. Type 1 includes multiplexer and latch. Type 2 includes multiplexer only. Type 3 includes multiplexer and decoder. It can be seen that there are 8 bits of type 1, 8 bits of type 2 and 16 bits of type 3.

Figure 2:
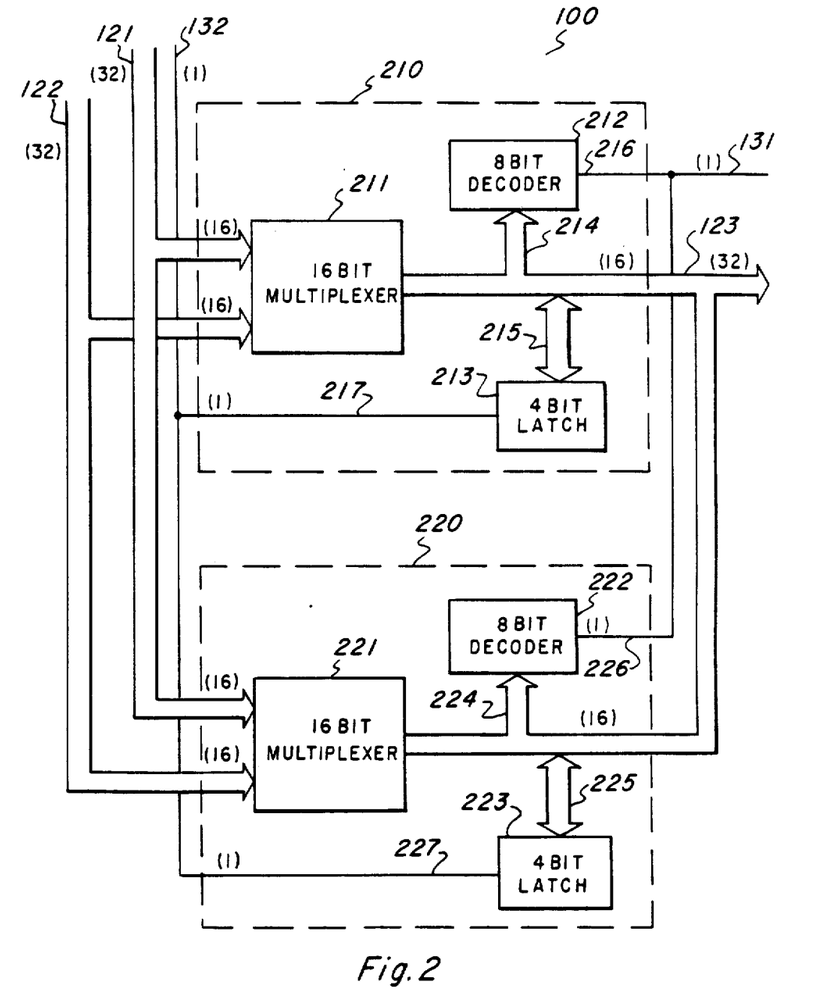
FIG. 2 illustrates one embodiment of the present invention in which the circuit illustrated in FIG. 2 is embodied in two custom integrated circuits.

It can be clearly seen that a common multiple of this number of bits of types 1 to 3 is two. Therefore, the present invention indicates that data processing circuit 100 may be constructed of two identical custom integrated chips. FIG. 2 illustrates construction of data processing circuit 100 in two identical integrated circuits 210 and 220. Each of the integrated circuits 210 and 220 receive 16 bits from 32 bit bus 121 and 16 bits from 32 bit bus 122. Each in turn generates 16 bits to 32 bit bus 123.

Integrated circuit 210 includes a 16 bit multiplexer 211, eight bit decoder 212 and four bit latch 213. Sixteen bit multiplexer 211 receives two 16 bit inputs and multiplexes into a single 16 bit output. Eight bit decoder 212 receives eight bits from eight bit bus 214 and generates a match signal on match line 216 if these eight bits correspond to an internal state. Four bit latch 213 samples four bits from four bit bus 215 upon receipt of an enable signal from enable line 217.

Integrated circuit 220 is identical to integrated circuit 210. Integrated circuit 220 includes 16 bit multiplexer 221, eight bit decoder 222 which receives input from eight bit bus 224 and generates an output on match line 226 and four bit latch 223 which receives inputs from four bit bus 225 and an enable signal on enable line 227.

Interconnection of integrated circuits 210 and 220 is relatively straightforward. Table 2 describes the bit distribution on the two chips. The first chip, integrated circuit 210, includes bits 0 to 3 of type 1, bits 8 to 11 of type 2 and bits 16 to 23 of type 3. The bit 0 to 3 of type 1 include four bits within 16 bit multiplexer 211 and the four bits of four bit latch 213. The four bits of type 2 include four additional bits of 16 bit multiplexer 211. Lastly, the eight bits of type 3 include eight bits within 16 bit multiplexer 211 and the eight bits of eight bit decoder 212. In a similar manner, chip 2, integrated circuit 220 includes bits 4 to 7 of type 1, bits 12 to 15 of type 2 and bits 24 to 31 of type 3.

The interconnection of the 16 bits from 32 bit bus 121 and 32 bit bus 122 to each of the integrated circuits 210 and 220 is straightforward. Similarly, the combination of the 16 bits from integrated circuit 210 and the 16 bits from integrated circuit 220 into 32 bit bus 123 is straightforward. However, the interconnection corresponding to match line 131 is more complicated. In order for a proper 16 bit match to be achieved, there must be a match signal on both match line 216 of integrated circuit 210 and match line 226 of integrated circuit 220. These two match lines 216 and 226 are illustrated in a wired AND manner for combination to generate the desired signal on matched line 131. Such a wired AND function can only be achieved if a matched signal on line 216 and on line 226 are high signals. In the case of any other type of logic condition, these two match lines must be coupled to an AND circuit in order to produce the signal on match line 131.

Similarly, enable line 132 must be applied to both integrated circuits 210 and 220. Note that this enable signal is applied to enable line 217 of integrated circuit 210 and to enable line 227 of integrated circuit 220. Thus, the generation of an enable signal on line 132 enables both four bit latch 213 and four bit latch 223. It should be pointed out that the circuit generating this enable signal on line 132 must have sufficient driving capacity in order to drive both enable line 217 and enable line 227.

Figure 3:
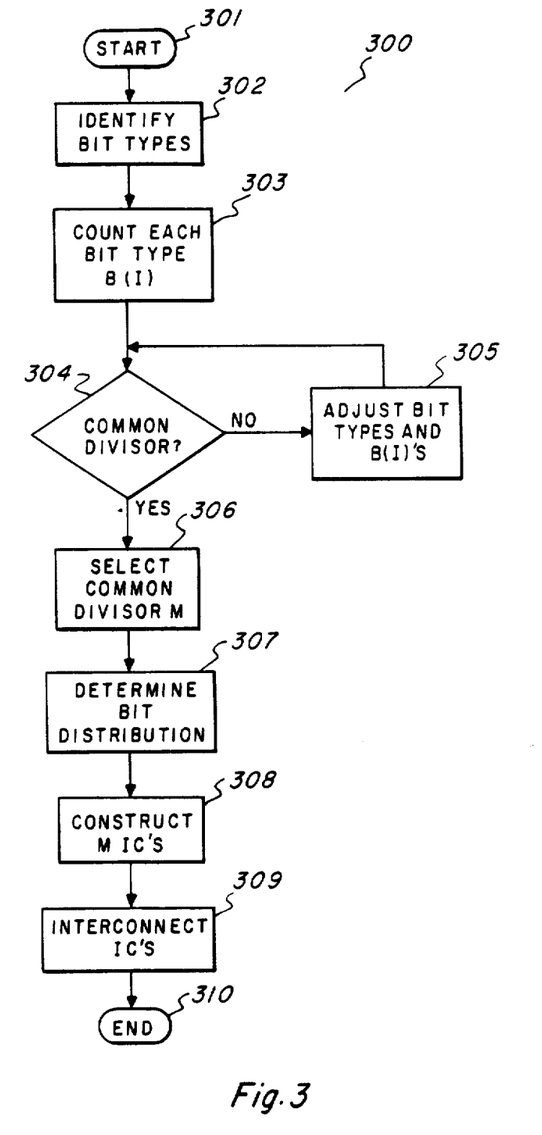
FIG. 3 illustrates a flow chart showing the steps required in employing the present invention.

FIG. 3 illustrates flow chart 300 showing the major steps required to practice the present invention. The process is begun by a start block 301. Firstly, the differing single bit types are identified (processing block 302). This is the equivalent of determining the three differing bit types noted above in conjunction with the circuit illustrated in FIG. 1. Next, the number of each bit type is counted (processing block 303). These may then be put into array form as B(I), in which B(I) corresponds to the number of bits of the I-th bit type.

Next, a test is made to determine whether or not there is a common divisor among all the B(I)'s (decision block 304). In the event that there is at least one such common divisor, then the process proceeds to employ this common divisor. However, in the event that no such common divisor is found, then it is necessary to adjust some bit types and their corresponding corresponding number of bits B(I) (processing block 305). This adjustment of bit types and their corresponding number of bits is employed in order to achieve a common divisor. This adjustment of bit types involves the subtraction of a number of bits from a simple bit type and the adding of a similar number of bits to a more complicated bit type. It should be noted that this more complicated bit type must be a superset of the simple bit type, that is, the more complicated bit type must include all of the structures required by the simple bit type. Thereafter, another attempt to find a common divisor is made (decision block 304). In the event that such a common divisor is still not found, then the adjustment of bit types and bit numbers B(I) is repeated (processing block 305).

Eventually an integer P may be found to set B(K) to B(K)−P and B(L) to B(L)+P and achieve a common divisor M, where the K-th single bit type is a subset of the L-th single bit type. Note that this adjustment results in the creation of P excess circuits, those included in the L-th single bit type which are not included in the K-th single bit type. In some instances it may be found that a common divisor may not be easily achieved. In such an event, the teachings of the present invention cannot be employed to form that data processing circuit with a plurality of identical custom integrated circuit chips.

Once one or more common divisors has been discovered, then a common divisor M is selected (processing block 306). It is believed that such a common divisor will often be found because many complex bit parallel data processing circuits are formed of 4, 8 and 16 bit wide data paths. In such an event, a common divisor of 2, 4 or 8 may be readily achieved. In the event that there is more tnan one common divisor, it is necessary to select only one for practice of the present invention. This selection may be based upon the number of signal lines required for an individual integrated circuit within the set, or the complexity of the particular circuits to be placed on the custom integrated circuit. Next, the bit distribution within the M custom integrated circuits is determined (processing block 307). The number of bits of each bit type I is B(I)/M. Because M has been previously determined as a common divisor of each of the bit numbers B(I)'s, this quotient will always be an integer. The distribution of the bits among the set of M identical integrated circuits is then made (processing block 307). This distribution of the bits among the integrated circuits once the number of bit types included within that integrated circuit is known, is straightforward. An example of the determination of the bits to be placed on the individual integrated circuits for data processing circuit 100 illustrated in FIG. 1 is set forth in Tables 2 to 4.

The next step in using the present invention is the construction of M different custom integrated circuits (processing block 308). This construction takes place according to known techniques for integrated circuit design and construction with the design having been determined by the previous steps. It should be noted that if the number of bits within differing bit types has been adjusted in accordance with processing block 305, it may be necessary to provide out of the integrated circuit different signals than would ordinarily be believed necessary. This is in conjunction with the interconnection of the integrated circuits in order to form the desired data processing circuit (processing block 309) and is required in order not to connect any redundant circuits made necessary by the adjustment of bit types. This technique will be more fully explained in conjunction with the description of FIGS. 6 and 7. At this point the process is complete (end block 310).

It should be clearly understood that the data processing circuit 100 illustrated in FIG. 1 can be constructed in accordance with the present invention in more than one manner. Data processing circuit 100 includes eight type 1 bits, eight type 2 bits and sixteen type 3 bits. This clearly indicates that these three bit types have common divisors of 2, 4 and 8. In accordance with the teachings of the present invention, this circuit can be constructed in two integrated circuits as illustrated in FIG. 2. In addition, however, the present invention also teaches that this data processing circuit 100 may be constructed of four identical integrated circuits or of eight identical integrated circuits.

Figure 4:
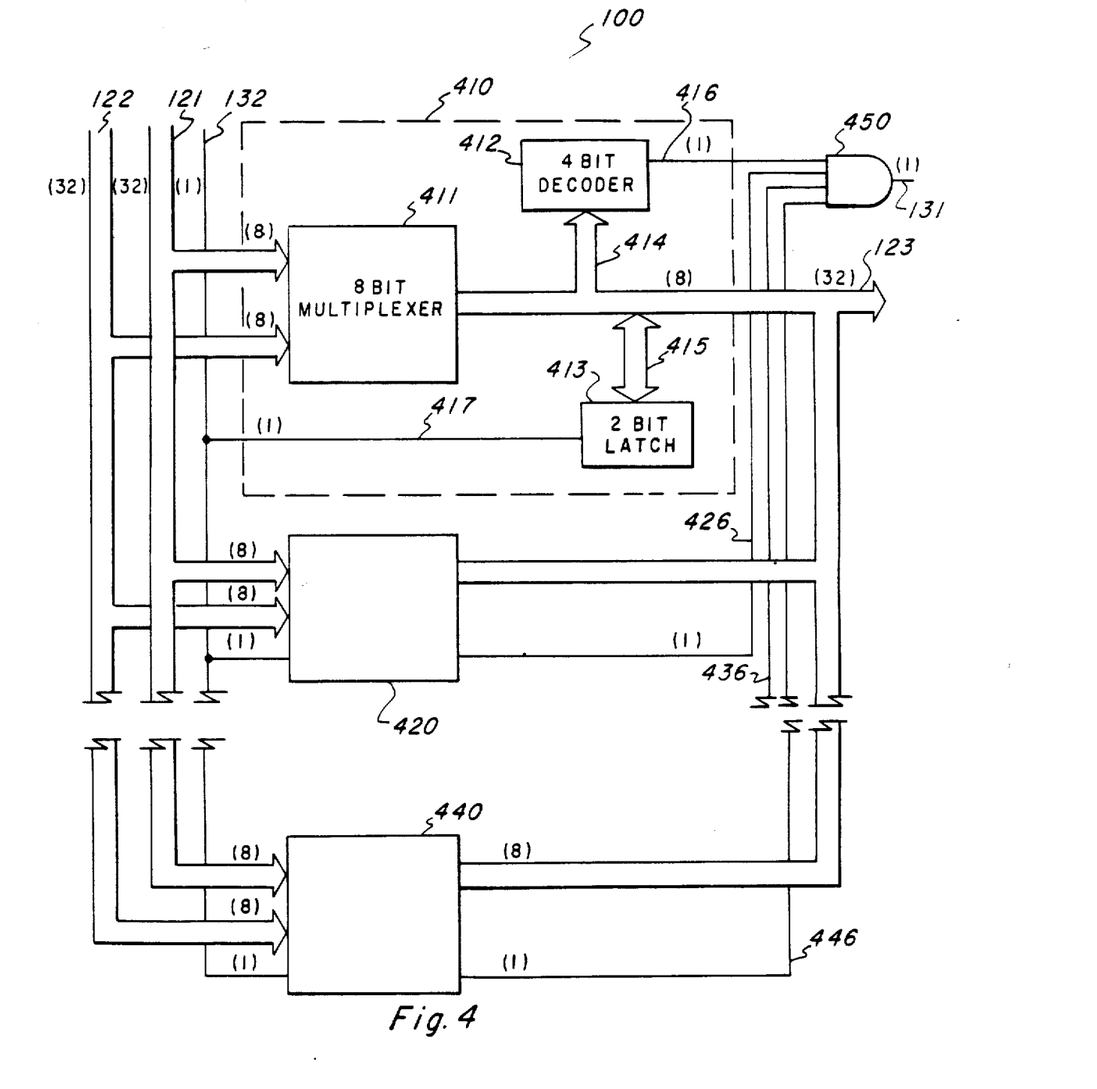
FIG. 4 illustrates an embodiment of the present invention in which the circuit illustrated in FIG. 1 is embodied in four integrated circuits.

FIG. 4 illustrates the manner of construction of data processing circuit 100 for the case of four identical integrated circuits. These four integrated circuits include integrated circuit 410, 420, 430 (not illustrated) and 440. Integrated circuit 410 is illustrated in full and is exemplary of the connections of each of the other integrated circuits 420 to 440.

Integrated circuit 410 includes eight bit multiplexer 411, four bit decoder 412 and two bit latch 413. Eight bit multiplexer 411 receives eight bits of the 32 bit bus 121 and eight bits of the 32 bit bus 122. Eight bit multiplexer 411 generates eight bits of output for 32 bit bus 123. Four bit decoder 412 receives four bits from eight bit multiplexer 411 via four bit bus 414. Four bit decoder 412 generates a match signal on match line 416. Two bit latch 413 receives two bits of data from two bit bus 415 and an enable signal on enable line on 417. As noted above in conjunction with FIG. 2, enable line 132 must have a driver with sufficient capacity to drive each of the four integrated circuits 410, 420, 430 and 440. Enable signal 131 is formed by AND circuit 450. The AND circuit 450 receives inputs from match lines 416, 426, 436 (from integrated circuit 430 not shown) and 446 and produces a logical AND output. In some instances use of an AND circuit such as AND circuit 450 is preferable to the wired AND illustrated in FIG. 2.

The distribution of bits among the four chips of data processing circuit 100 illustrated in FIG. 4 is shown in Table 3. As can be seen by the inspection of FIG. 4 and Table 1, each integrated circuit 410, 420, 430 and 440 includes a two bit multiplexer and a two bit latch on the lower order bits, a two bit multiplexer on the next higher order bits and a four bit multiplexer and a four bit decoder on the most significant bits.

Figure 5:
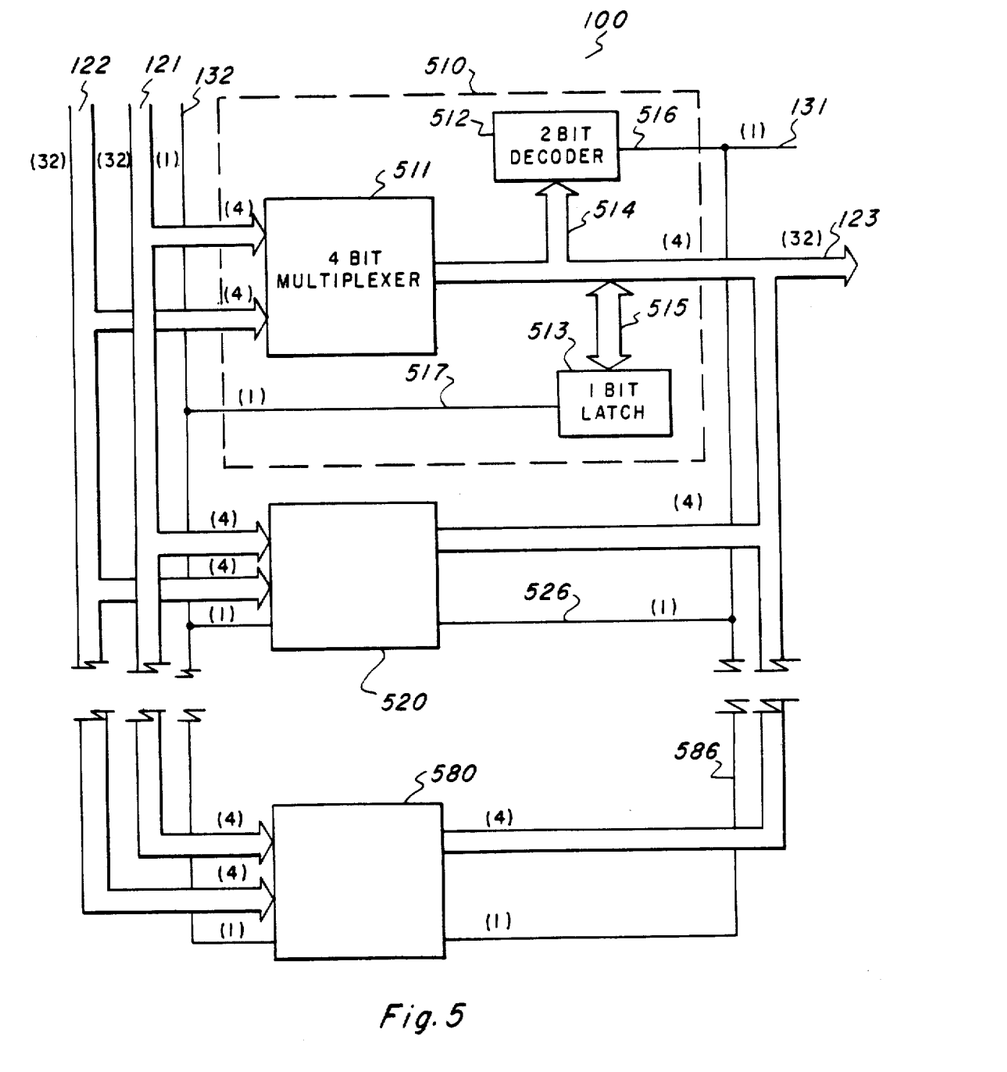
FIG. 5 illustrates an embodiment of the present invention in which the circuit illustrated in FIG. 1 is embodied on eight integrated circuit chips.

FIG. 5 similarly illustrates an embodiment of a data processing circuit 100 which includes eight integrated circuit chips, integrated circuit 510, 520, 530 to 570 (not illustrated) and 580. Each of the integrated circuits 510 to 580 are connected in a manner similar to that of integrated circuits 410 to 440. Each integrated circuit includes the same features illustrated in detail in integrated circuit 510. Four bit multiplexer 511 receives four bits from 32 bit data bus 121, four bits from 32 bit data bus 122 and generates four bits to 32 bit data bus 123. Two bit decoder 512 receives two bits of data on two bit data bus 514 and generates a match signal on match line 516. One bit latch 513 receives one bit of data on one bit data bus 515 and an enable signal on enable line 517. The integrated circuits 510 to 580 are connected in a manner similar to that shown in FIG. 4 in conjunction with integrated circuits 410 to 440 with the exception of a wired AND in place of AND circuit 450. Table 4 delineates the distribution of the bits among the eight integrated circuits of this embodiment of the invention. Note that each integrated circuit 510 to 580 includes a lowest order bit with a one bit multiplexer and a one bit latch a next higher bit including a one bit multiplexer and two most significant bits including two bit multiplexer and two bit decoder.

The selection of the common divisor is a design choice. In making this design choice, consideration must be made of the number of signal lines which must enter each of the identical integrated circuit chips and the complexity of the circuit to be formed on the identical integrated circuit chips. An example of the 2 chip embodiment illustrated in FIG. 2, each integrated circuit chip 210 and 220 requires 50 signal lines. This is at the upper limit of the number of signal lines which may be conveniently coupled to an integrated circuit chip. The 4 chip embodiment illustrated in FIG. 4 requires 26 signal lines and is well within the pin out capacity of current technology. The 8 chip embodiment illustrated in FIG. 5 requires only 14 signal lines. However, the requirement for external connection to these eight chips is more complex than in either of the previous embodiments. Therefore, the design choice must be made between the ease of final fabrication which would suggest fewer chips with more signal lines and the ease of integrated circuit manufacturer which would suggest more chips with fewer signal lines.

Figure 6:
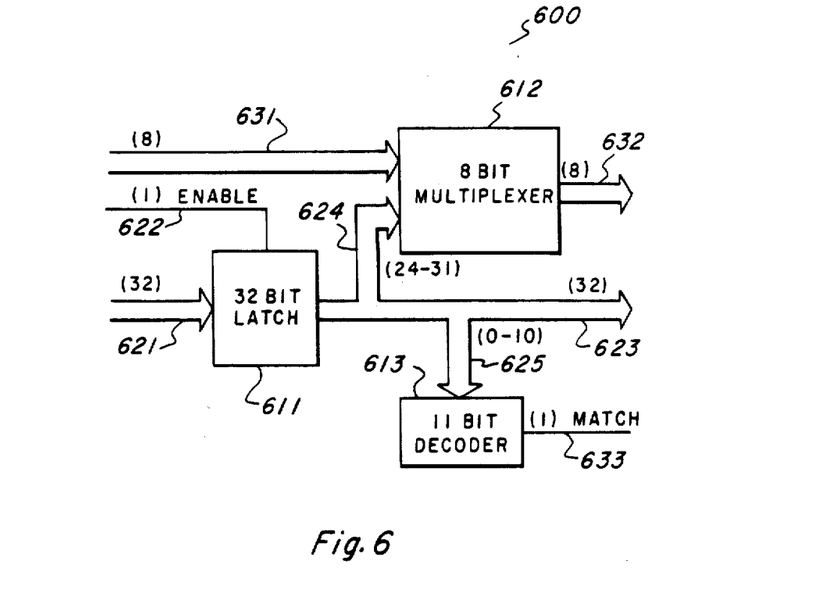
FIG. 6 illustrates another type of nonsymmetrical data processing circuit to which the present invention may be advantageously employed.

FIG. 6 illustrates data processing circuit 600 to which a further embodiment of the present application may be applied. Data processing circuit 600 includes 32 bit latch 611, eight bit multiplexer 612 and 11 bit decoder 613. When constructed on a single integrated circuit, data processing circuit 600 would require 82 signal lines.

Thirty bit latch 611 receives 32 bits of data from 32 bit bus 621. Thirty two bit latch 611 is controlled by enable line 622. Thirty two bit latch 611 provides an output on 32 bit bus 623.

Eight bit multiplexer 612 receives eight bits of data from eight bit bus 631. Eight bit multiplexer also receives the eight most significant bits from the 32 bit latch 611 via eight bit bus 624. Eight bit multiplexer 612 generates eight bits of output on eight bit bus 632. Eleven bit decoder 613 is coupled to the 11 least significant bits from 32 bit latch 611 via 11 bit data bus 625. Eleven bit decoder 613 generates a match signal on match line 633 when the bits received on 11 bit bus 625 corresponds to an internal reference.

Table 5 illustrates the distribution of circuits among the 32 bits within data processing circuit 600. Bits 0 to 10 (11 bits) each include a latch circuit and a decoder. Bits 11 to 23 (13 bits in all) include only the latch circuit. Bits 24 to 31 (8 bits in all) include both the latch and the multiplexer. Dividing these categories into differing single bit types, it can be readily seen that there are three different types. Type 1 includes the latch circuit and the decoder. Type 2 includes the decoder only and Type 3 includes the decoder and the multiplexer circuit. By inspection of Table 5 it can be readily determined that there are 11 Type 1 bits, 13 type 2 bits and 8 Type 3 bits.

The set of bit numbers 11, 13 and 8 do not have a common divisor. Thus, the teachings the present invention cannot be applied to data processing circuit 600 without modification. This modification can be made by noting that each Type 1 bit is a superset of the Type 2 bits. That is, each Type 1 bit includes all of the circuitry required for a Type 2 bit. Thus, it is possible to convert one of the type 2 bits into a Type 1 bit, thereby making 12 of each of these bit types. With the number of bits within each type (B(I)), a common divisor of 4 is achieved.

Figure 7:
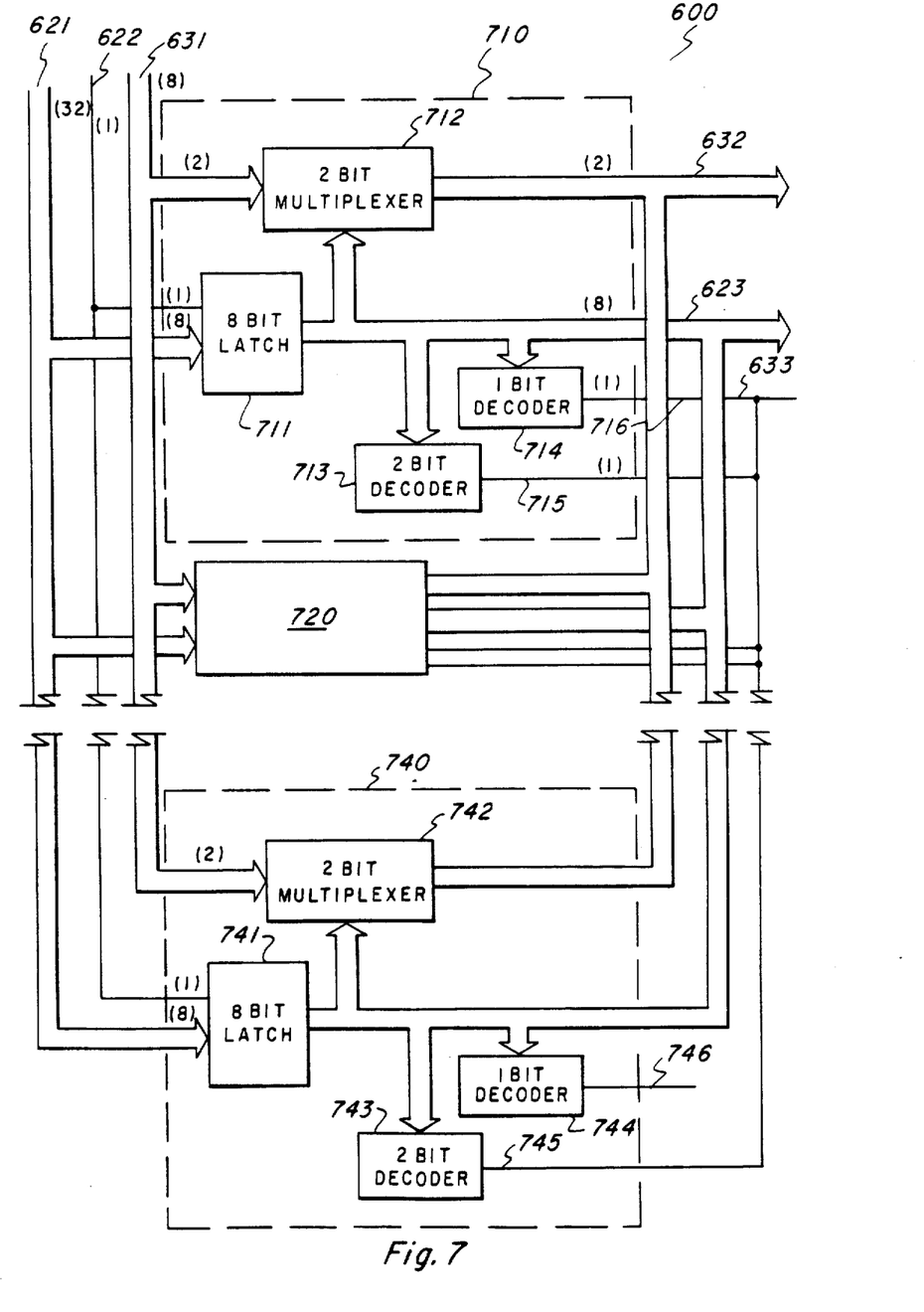
FIG. 7 illustrates an embodiment of the present invention in which the circuit illustrated in FIG. 6 is embodied in four integrated circuits.

FIG. 7 illustrates the manner of construction of data processing circuit 600 in accordance with the teachings of the present invention. Integrated circuit 710 is exemplary of the four integrated circuits required in this embodiment. Integrated circuit 710 includes eight bit latch 711, two bit multiplexer 712, two bit decoder 713 and one bit decoder 714. Eight bit latch 711 receives eight bits from 32 bit bus 621 and an enable signal from enable line 622. Two bit multiplexer 710 receives two bits from eight bit bus 631 and two bits from eight bit latch 711. Two bit multiplexer 712 generates two bits for application to eight bit bus 632. Two bit decoder 713 receives two bits from eight bit latch 711 and generates a match signal on match line 715. One bit decoder 714 receives one bit of data from eight bit latch 711 and generates a match signal on match line 716. As illustrated in FIG. 7, both match lines 715 and 716 are wired ANDed to match line 633.

Integrated circuits 720 and 730 (not illustrated) are identical to integrated circuit 710. Integrated circuits 720 and 730 are connected in a similar manner to the various buses and signal lines illustrated in FIG. 7. A detailed description of these integrated circuits is therefore unnecessary.

Integrated circuit 740 is identical to integrated circuit 710. However, integrated circuit 740 is coupled to the signal lines in a manner differing from the manner in which integrated circuit 710 through 730 are connected. Integrated circuit 740 includes eight bit latch 741, two bit multiplexer 742, two bit decoder 743 and one bit decoder 744. Integrated circuit 740 is coupled to the various bus and signal lines in a manner identical to the connections of integrated circuit 710 except for one detail. The output of match line 746 from one bit decoder 744 is not connected to the wired AND line and hence not connected to match line 633. One bit decoder 744 represents the redundant structure created when one bit was transferred from Type 2 to Type 1. By inspection of FIG. 6, it is clear that only an 11 bit decoder is necessary. These 11 bits are achieved by the two decoders appearing in integrated circuits 710, 720 and 730 including 3 bits each, and the two additional bits of two bit decoder 743 appearing in integrated circuit 740. The twelfth bit, that is one bit decoder 744, is not necessary and is therefore not connected. Note that this requirement to be able to not connect one bit of the three bits of decoder in one of the four integrated circuit chips thus requires each of these identical integrated circuit chips to be constructed so that the outputs of a two bit decoder and a one bit decoder are provided external to the integrated circuit chip. This requirement for an extra pin in each of the identical integrated circuit chips is a disadvantage, however, this disadvantage may be substantially outweighed by the advantage of providing the entire circuit on a number of identical integrated circuit chips.

In general it is not necessary to provide extra signal pins on the integrated circuits in the case in which the redundant circuits are connected to an input bus or an output bus. In such an event every bit of the L-th bit type including the P bits with the redundant circuits will have separate input or output pins. In such an event the pins coupled to the redundant circuits are left unconnected.

The design problem differs if the redundant circuits are connected together with nonredundant circuits to a single input or output. FIG. 7 illustrates the case of a single output line, but the case of a single input line is analogous. Separate pins must be provided to permit external connection of nonredundant circuits and nonconnection of redundant circuits. In general, if P is the number of redundant circuits which must be left unconnected, each integrated circuit must have a set of first pins (either input pins or output pins as the case may be) equal to P/M rounded up to the nearest interger connected to circuits of the L-th single bit type and a single second pin connected to the rest of the circuits of the L-th type.

In the example of FIG. 7, P equals 1 and M equals 4. There is one redundant circuit of type 1, namely the additional decoder. The number of extra pins must be ¼ rounded up to the nearest integer, which is 1. Thus there must be a separate output from each integrated circuit for one of the three decoders while the other two decoders may be internally ANDed. This provision of additional signal pins permits proper connection of the necessary circuits and nonconnection of the redundant circuit.

The distribution of the bits between the four integrated circuit chips is disclosed in Table 6. Note the asterisk by bit number 11. This asterisk corresponds to the redundant one bit decoder 744. Although chip 4 includes three bits of Type 1, bit number 11 is coupled to the rest of the data processing circuit 600 as if it were a Type 2 bit. Therefore, this bit is specially noted in Table 6.

The present invention involves a technique for reducing the number of specially designed integrated circuit chips needed in order to embody a complex nonsymmetrical bit parallel data processing circuit in integrated form. This technique is useful in reducing the number of special purpose integrated circuit chips which must be designed in order to provide a desired circuit. The reason why it would be difficult to embody such circuits in accordance with the present invention is the necessity for a larger number of pins to the integrated circuit chips. Any circuit that requires a great deal of bit to bit interaction would require a good number of pins at the integrated circuit boundaries in order to couple between various integrated circuits. In the event that a adder or counter is divided into a relatively few number of pieces, thereby requiring only a few interactions between bits across integrated circuit boundaries, then the present invention may be employed even for those circuits. However, if it is necessary to distribute the bits of such a circuit among a large number of integrated circuits, then the number of pins required for the bit to bit interaction may become prohibitive. However, with this one exception this technique may be employed in a wide variety of complex data processing circuits.

TABLE 1

| BIT | CIRCUITS BY BIT NUMBER | | |
|---|---|---|---|
| | Multiplexer | Latch | Decoder |
| 0 | X | X | |
| 1 | X | X | |
| 2 | X | X | |
| 3 | X | X | |
| 4 | X | X | |
| 5 | X | X | |
| 6 | X | X | |
| 7 | X | X | |
| 8 | X | | |
| 9 | X | | |
| 10 | X | | |
| 11 | X | | |
| 12 | X | | |
| 13 | X | | |
| 14 | X | | |
| 15 | X | | |
| 16 | X | | X |
| 17 | X | | X |
| 18 | X | | X |
| 19 | X | | X |
| 20 | X | | X |
| 21 | X | | X |
| 22 | X | | X |
| 23 | X | | X |

TABLE 1-continued

| | CIRCUITS BY BIT NUMBER | | |
|---|---|---|---|
| BIT | Multiplexer | Latch | Decoder |
| 24 | X | | X |
| 25 | X | | X |
| 26 | X | | X |
| 27 | X | | X |
| 28 | X | | X |
| 29 | X | | X |
| 30 | X | | X |
| 31 | X | | X |

TABLE 2

| BIT TYPE DISTRIBUTION ON TWO CHIPS | | | |
|---|---|---|---|
| CHIP | TYPE 1 | TYPE 2 | TYPE 3 |
| 1 | 0 to 3 | 8 to 11 | 16 to 23 |
| 2 | 4 to 7 | 12 to 15 | 24 to 31 |

TABLE 3

| BIT TYPE DISTRIBUTION ON FOUR CHIPS | | | |
|---|---|---|---|
| CHIP | TYPE 1 | TYPE 2 | TYPE 3 |
| 1 | 0 to 1 | 8 to 9 | 16 to 19 |
| 2 | 2 to 3 | 10 to 11 | 20 to 23 |
| 3 | 4 to 5 | 12 to 13 | 24 to 27 |
| 4 | 6 to 7 | 14 to 15 | 28 to 31 |

TABLE 4

| BIT TYPE DISTRIBUTION ON EIGHT CHIPS | | | |
|---|---|---|---|
| CHIP | TYPE 1 | TYPE 2 | TYPE 3 |
| 1 | 0 | 8 | 16 to 17 |
| 2 | 1 | 9 | 18 to 19 |
| 3 | 2 | 10 | 20 to 21 |
| 4 | 3 | 11 | 22 to 23 |
| 5 | 4 | 12 | 24 to 25 |
| 6 | 5 | 13 | 26 to 27 |
| 7 | 6 | 14 | 28 to 29 |
| 8 | 7 | 15 | 30 to 31 |

TABLE 5

| | CIRCUITS BY BIT NUMBER | | |
|---|---|---|---|
| BIT | Multiplexer | Latch | Decoder |
| 0 | X | | X |
| 1 | X | | X |
| 2 | X | | X |
| 3 | X | | X |
| 4 | X | | X |
| 5 | X | | X |
| 6 | X | | X |
| 7 | X | | X |
| 8 | X | | X |
| 9 | X | | X |
| 10 | X | | X |
| 11 | X | | |
| 12 | X | | |
| 13 | X | | |
| 14 | X | | |
| 15 | X | | |
| 16 | X | | |
| 17 | X | | |
| 18 | X | | |
| 19 | X | | |
| 20 | X | | |
| 21 | X | | |
| 22 | X | | |
| 23 | X | | |
| 24 | X | X | |
| 25 | X | X | |
| 26 | X | X | |
| 27 | X | X | |
| 28 | X | X | |
| 29 | X | X | |
| 30 | X | X | |
| 31 | X | X | |

TABLE 6

| BIT TYPE DISTRIBUTION ON FOUR CHIPS | | | |
|---|---|---|---|
| CHIP | TYPE 1 | TYPE 2 | TYPE 3 |
| 1 | 0 to 2 | 12 to 13 | 20 to 22 |
| 2 | 3 to 5 | 14 to 15 | 23 to 25 |
| 3 | 6 to 8 | 16 to 17 | 26 to 28 |
| 4 | 9 to 11* | 18 to 19 | 29 to 31 |

I claim:

1. A method for constructing a nonsymetrical N bit parallel data processing circuit comprising the steps of:
identifying each different single bit type within the N bit parallel processing circuit, wherein a single bit type is a single bit having a unique, identifiable set of functions performable thereon by the N bit parallel data processing circuit;
determining the number of bits B(I) which are of each I-th single bit type within the N bit parallel data processing circuit;
determining a common divisor M of the number of bits B(I) for each single bit type, the common divisor M being greater than one;
constructing M identical integrated circuits, each of said integrated circuits having B(I) divided by M number of bits of each I-th different single bit type; and
interconnecting said M identical integrated circuits to form the N bit parallel data processing circuit.

2. A method of constructing a non-symmetrical N bit parallel data processing circuit as claimed in claim 1, wherein:
said N bit parallel data processing circuit includes an input bus having a plurality of parallel conductors connected to respective ones of the B(I) bits of the J-th single bit type;
said step of constructing M identical integrated circuits includes constructing each integrated circuit having a separate input pin for each of said B(J) divided by M bits of the J-th single bit type; and
said step on interconnecting said M identical integrated circuits includes connecting said plurality of parallel conductors of said input bus to respective ones of said input pins of the J-th single bit type.

3. A method of constructing a non-symmetrical N bit parallel data processing circuit as claimed in claim 1, wherein:
said N bit parallel data processing circuit includes an output bus having a plurality of parallel conductors connected to respective ones of the B(J) bits of the J-th single bit type;
said step of constructing M identical integrated circuits includes constructing each integrated circuit having a separate output pin for each of said B(J) divided by M bits of the J-th single bit type; and
said step of interconnecting said M identical integrated circuits includes connecting said plurality of parallel conductors of said output bus to respective ones of said output pins of the J-th single bit type.

4. A method of constructing a nonsymmetrical N bit parallel data processing circuit as claimed in claim 1, wherein:
- said N bit parallel data processing circuit includes an input line connected to each of the B(J) bits of the J-th single bit type in parallel;
- said step of constructing M identical integrated circuits includes constructing each integrated circuit having a single input pin connected to all of the B(J) divided by M bits of the J-th single bit type; and
- said step of interconnecting said M identical integrated circuits includes connecting said input line to each of said single input pins of the J-th single bit type on each of said M integrated circuits.

5. A method of constructing a nonsymmetrical N bit parallel data processing circuit as claimed in claim 1, wherein:
- said N bit parallel data processing circuit includes an output line connected to each of the B(J) bits of the J-th single bit type in parallel;
- said step of constructing M identical integrated circuits includes constructing each integrated circuit having a single output pin connected to all of the B(J) divided by M bits of the J-th single bit type; and
- said step of interconnecting said M identical integrated circuits includes connecting each of said single output pins of the J-th single bit type to an AND circuit, the output of said AND circuit being connected to said output line.

6. A method of constructing a nonsymmetrical N bit parallel data processing circuit comprising the steps of:
- identifying each different single bit type within the N bit parallel processing circuit, wherein a single bit type is a single bit having a unique, identifiable set of functions performable thereon by the N bit parallel data processing circuit;
- determining the number of bits B(I) which are of each I-th single bit type within the N bit parallel data processing circuit;
- creating P redundant circuits within an L-th single bit type by subtracting P from B(K) and adding P to B(L), the L-th single bit type being a superset of the K-th single bit type;
- determining a common divisor M of the number of bits B(I) for each single bit type, the common divisir M being greater than one;
- constructing M identical integrated circuits, each of said integrated circuits having B(I) divided by M number of bits of each I-th bit type; and
- interconnecting said M identical integrated circuits to form the N bits parallel data processing circuit, said interconnecting not including connecting said P redundant circuits of the L-th single bit type.

7. A method of constructing a nonsymmetrical N bit parallel data processing circuit as claimed in claim 6, wherein:
- said N bit parallel data processing circuit includes an input bus having a plurality of parallel conductors connected to respective ones of the B(I) bits of the J-th single bit type;
- said step of constructing M identical integrated circuits includes constructing each integrated circuit having a separate input pin for each of said B(J) divided by M bits of the J-th single bit type; and
- said step on interconnecting said M identical integrated circuits includes connecting said plurality of parallel conductors of said input bus to respective ones of said input pins of the J-th single bit type.

8. A method of constructing a nonsymmetrical N bit paralled data processing circuit as claimed in claim 6, wherein:
- said N bit paralled data processing circuit includes an input bus having a plurality of parallel conductors connected to respective ones of B(L) minus P of the L-th single bit type;
- said step of constructing said M identical integrated circuits includes constructing each integrated circuit having a separate input pin for each of said B(L) bits of the L-th single bit type;
- said step of interconnecting said M identical integrated circuits includes connecting said plurality of conductors of said input bus to respective ones of said input pins of B(L) minus P bits of said L-th single bit type and not connecting said input pins of P bits of said L-th single bit type.

9. A method of constructing a non-symmetrical N bit parallel data processing circuit as claimed in claim 6, wherein:
- said N bit parallel data processing circuit includes an output bus having a pluralitv of parallel conductors connected to respective ones of the B(J) bits of the J-th single bit type;
- said step of constructing M identical integrated circuits includes constructing each integrated circuit having a separate output pin for each of said B(J) divided by M bits of the J-th single bit type; and
- said step of interconnecting said M identical integrated circuits includes connecting said plurality of parallel conductors of said output bus to respective ones of said output pins of the J-th single bit type.

10. A method of constructing a nonsymmetrical N bit parallel data processing circuit as claimed in claim 6, wherein:
- said N bit parallel data processing circuit includes an output bus having a plurality of parallel conductors connected to respective ones of B(L) minus P bits of said L-th single bit type;
- said step of constructing said M identical integrated circuits includes constructing each integrated circuit having a separate output pin for each of said B(L) bits of said L-th single bit type; and
- said step of interconnecting said M identical integrated circuits includes connecting said plurality of conductors of said output bus to respective ones of said output pins of B(L) minus P bits of said L-th single bit type and not connecting said output pins of P bits of said L-th single bit type.

11. A method of constructing a nonsymmetrical N bit parallel data processing circuit as claimed in claim 6, wherein:
- said N bit parallel data processing circuit includes an input line connected to each of the B(J) bits of the J-th single bit type in parallel;
- said step of constructing M identical integrated circuits includes constructing each integrated circuit having a single input pin connected to all of the B(J) divided by M bits of the J-th single bit type; and
- said step of interconnecting said M identical integrated circuits includes connecting said input line to each of said single input pins of the J-th single bit type on each of said M integrated circuits.

12. A method of constructing a nonsymmetrical N bit paralled data processing circuit as claimed in claim 6, wherein:
- said N bit parallel data processing circuit includes an input line connected to each of B(L) minus P bits of the L-th single bit type;
- said step of constructing M identical integrated circuits includes constructing each integrated circuit having first input pins for each of Q bits of the L-th type and having a single second input pin for all remaining bits of the L-th single bit type, where Q is P divided by M rounded up to the nearest integer; and
- said step of interconnecting said M identical integrated circuits includes connecting said input line to the input pins of said second input pins and Q minus P of said first input pins and not connecting P of said first input pins.

13. A method of constructing a nonsymmetrical N bit parallel data processing circuit as claimed in claim 6, wherein:
- said N bit parallel data processing circuit includes an output line connected to each of the B(J) bits of the J-th single bit type in parallel;
- said step of constructing M identical integrated circuits includes constructing each integrated circuit having a single output pin connected to all of the B(J) divided by M bits of the J-th single bit type; and
- said step of interconnecting said M identical integrated circuits includes connecting each of said single output pins of the J-th single bit type to an AND circuit, the output of said AND circuit being connected to said output line.

* * * * *